No. 879,407. PATENTED FEB. 18, 1908.
F. C. OSBORN.
CHEESE CUTTER.
APPLICATION FILED DEC. 15, 1904.
2 SHEETS—SHEET 1.
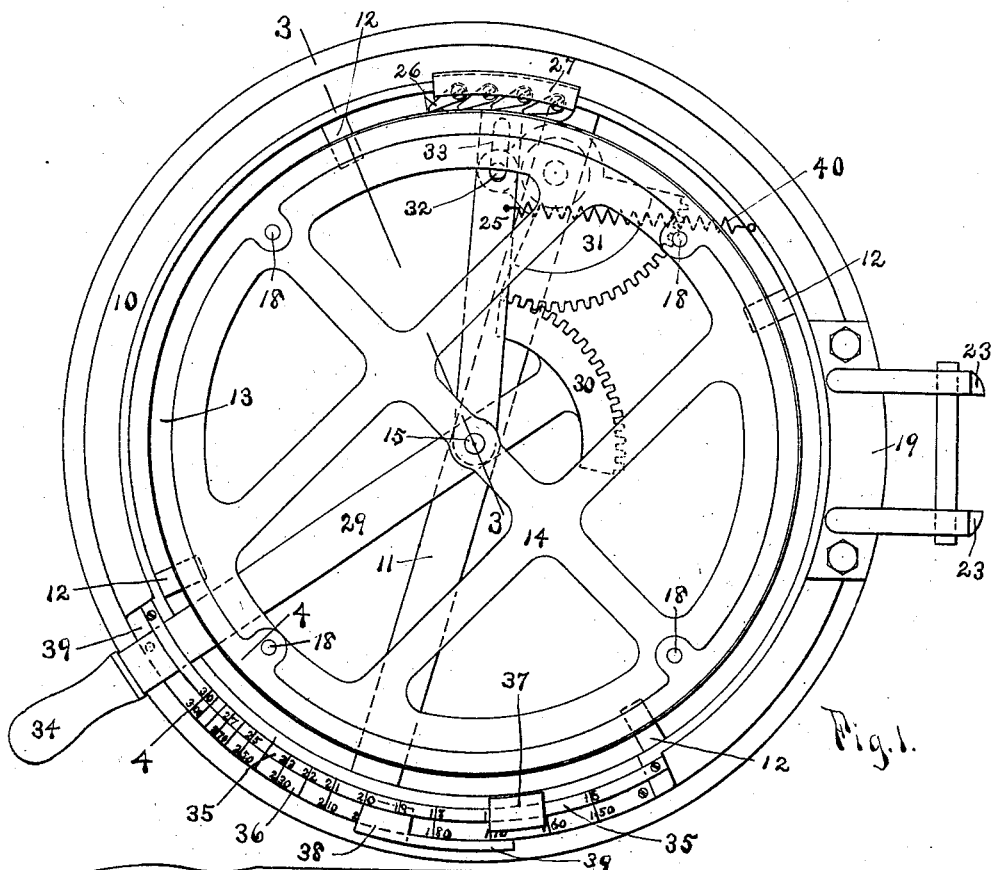
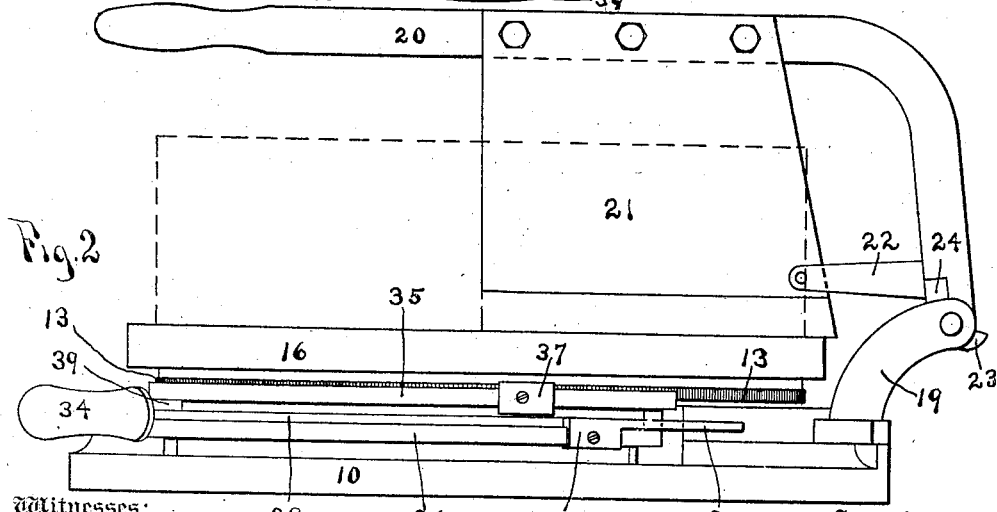
Witnesses: Inventor
Louis Ott Francis C. Osborn.
A. F. Wilcox By his Attorney
Edward N. Pagelsen.

No. 879,407. PATENTED FEB. 18, 1908.
F. C. OSBORN.
CHEESE CUTTER.
APPLICATION FILED DEC. 15, 1904.
2 SHEETS—SHEET 2.
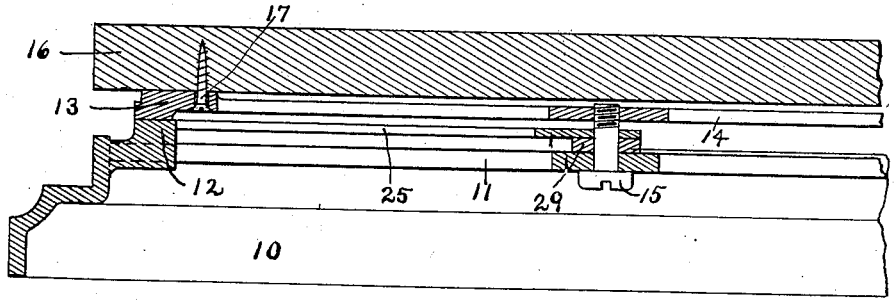
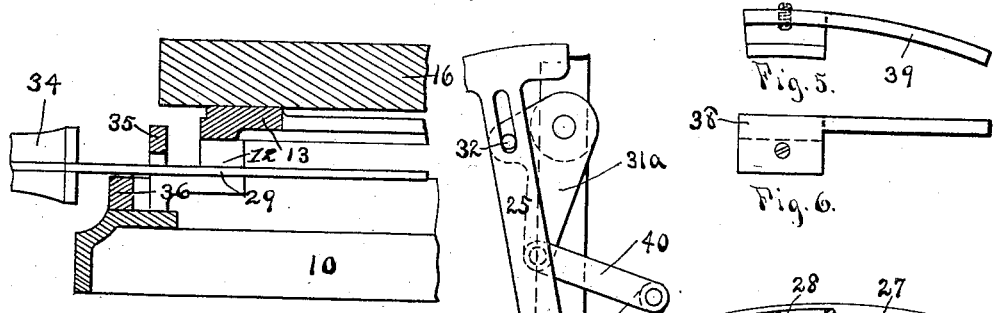
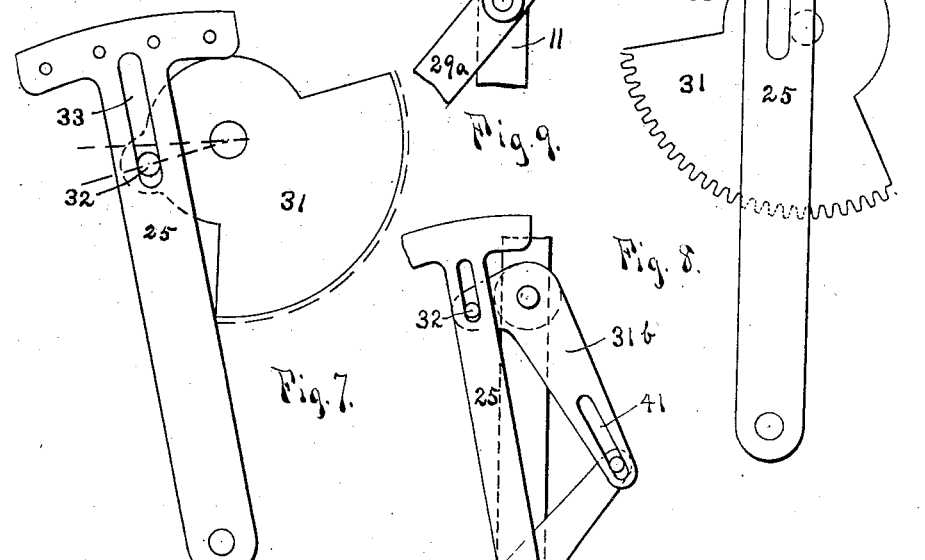
Witnesses:
Louis Ott
A. J. Wilcox
Inventor
Francis C. Osborn
By his Attorney
Edward N. Pagelsen.

UNITED STATES PATENT OFFICE.

FRANCIS C. OSBORN, OF DETROIT, MICHIGAN.

CHEESE-CUTTER.

No. 879,407.　　　　Specification of Letters Patent.　　　　Patented Feb. 18, 1908.

Application filed December 15, 1904. Serial No. 236,956.

*To whom it may concern:*

Be it known that I, FRANCIS C. OSBORN, a citizen of the United States, and a resident of Detroit, in the county of Wayne and State of Michigan, have invented a new and useful Improved Cheese-Cutter, of which the following is a specification.

My invention relates to that class of machines in which the cheese is supported on a rotatable table that may be turned by suitable mechanism to the proper extent to measure off the desired weight or amount to be severed.

The principal object of my improvement is to provide accurate mechanism operated and adjusted in a novel manner to measure off the desired amount of cheese of different weights, sizes and values per pound.

A further object of my improvement is to provide a machine of this kind in which the cheese is turned through an angle corresponding to the desired amount, and in which the operating handle when moving at a uniform speed turns the cheese at constantly decreasing speed, the cheese coming to absolute rest before the operating handle completes its movement, thus avoiding any possibility of too great movement on account of the inertia of the cheese and the moving parts.

A further object of my improvement is to provide a machine of this kind which shall be strong, accurate, simple, and inexpensive to manufacture.

I attain these objects by the construction illustrated in the accompanying drawings, in which Figure 1 is a plan of the operating mechanism, the cutting knife and rotatable table being removed. Fig. 2 is an elevation of the complete machine. Fig. 3 is a vertical cross section on the line 3—3 of Fig. 1. Fig. 4 is a cross section on the line 4—4 of Fig. 1 showing the relative positions of the operating handle and the graduated bars, only. Figs. 5 and 6 are detail views of one of the stops. Figs. 7 and 8 are enlarged views of details of the preferred form of the operating mechanism. Figs. 9 and 10 show modified forms of this part of the operating mechanism.

Similar reference characters refer to like parts throughout the several views.

Cheese cutters as commonly constructed comprise a base, a revoluble table, mechanism to revolve the table and a knife for cutting off the desired amount of material. In the drawings the base is shown as a ring 10 having a bar 11 extending across the center, and four upwardly extending lugs 12 upon which rests the toothed ring 13. This ring has an H shaped spider 14 which is bored and threaded to engage the upper end of the bolt 15 which passes through and is revoluble in a hole in the center of the bar 11. This bolt is screwed so firmly into the spider as to hold the ring quite firmly against the lugs 12 in order to cause considerable friction which will prevent any undesirable movement of the ring. Secured to the ring 13 is the table 16 which is held in place by screws 17 passing up through the holes 18 in the ring. To the base is secured the bracket 19, between the arms of which is pivoted one end of the knife carrier 20, to which is secured the knife 21. A small arm 22 on the carrier engages the rear edge of the knife to steady it. Lugs 23 on the bracket lie in the path of lugs 24 on the pivot end of the knife carrier to furnish a rest so that the knife and its carrier may be held in position when swung up out of the way.

The ring 13 is provided with fine teeth on its outer edge as shown in Fig. 2 which teeth are also indicated in Fig. 8. Pivoted on the bolt 15 is the pawl carrier 25 at the outer end of which are pivoted a number of pawls 26 which engage the teeth of the ring. While one pawl would operate to turn the ring, the distance that the carrier moves before the ring turns with it might in some cases almost equal the pitch of the teeth. But with four pawls spaced so that the distance between each two is a multiple of the pitch plus one fourth of the pitch, the pawls at the most can only move one fourth of the pitch, before one of them engages a tooth. A shield 27 secured to the end of the carrier partly covers the pawls and also carries the springs 28 that hold the pawls into engagement with the teeth. Pivoted on the bolt 15 is the operating lever 29 which carries on its inner end the segment 30, which engages the teeth of the sector 31, pivoted on the cross bar 11. A pin 32 on this sector is slidable in the slot 33 in the pawl carrier. The amount of movement therefore of the pawl carrier depends upon the extent the operating lever travels. The movement of the handle 34 to the right causes the pawls 26 to move to the right, and so also the pawls and handle will move together to the left. A spring 40 secured to the pawl carrier and to the vase prevents lost motion. On the base ring are secured two graduated bars 35 and 36 between which the operating lever travels. On these bars are adjustable stops 37 and 38 to determine the extent of movement of the lever to the right. A fixed stop 39, to the left, limits its movement in that direction. The operating lever is quite thin near its outer end so that it may be easily bent up to engage with the stop 37. One of these stops may be so adjusted, that at each complete movement of the operating handle, the table will be revolved to such an extent that a piece of cheese of fixed value may be cut off, while the other stop will determine the weight of the severed portion. It often happens that the stop 38 is so far in advance of stop 37 that the operating lever can drop down and pass under the stop 37. To prevent this I provide the stop 38 with a tail or extension 39 which effectually holds the lever in contact with the stop 37 under such circumstances.

It is of great importance that the table carrying the cheese should stop at the exact point desired so that the predetermined amount may be cut off. To do this I have found it desirable to stop the table slowly while the operating handle is still moving at its maximum speed to the left. In Fig. 8 is shown the sector 31 with its pin 32 at the point reached when the lever 29 is in contact with the stop 38 in one of its positions. In Fig. 7 the positions of the different parts at the ends of their movements are indicated and it will there be seen that while the sector 31 is turning through the last 12 or 15 degrees, (the angle indicated in dotted lines) the pawl carrier is stationary. As the segment 30 and the teeth of the sector 31 are of about the same radius, it will be seen that during the last ten degrees of movement of the operating lever the table is stationary and had been decreasing its speed almost from the time it started.

If the rate of angular movements of the handle and table were constant with respect to each other during the entire stroke of the handle, the spaces on the graduated bars would vary greatly, the graduations near the fixed stop becoming very minute. But in the construction shown, the rate of movement of the handle as it approaches the fixed stop becomes relatively greater, so that for a given movement of the table the handle must move increasing distances. The difference between the movements of the handle to turn the table one sixty-fourth and one sixty-third of a revolution is therefore not so far different between the movements for one fifteenth and one sixteenth of a revolution of the table.

Instead of the toothed segment 30 and sector 31, either of the connections shown in Figs. 9 and 10 may be employed. In Fig. 9 the toothed portion of the sector is replaced by the arm $31^a$ having a pin at its outer end, the segment 30 is replaced by a pin in the end of the lever $29^a$ and the connection is made by the link 40.

In Fig. 10 the arm $31^b$ is slotted, the pin at the end of the arm $29^b$ working in slot 41. It will be noticed that in both of these modifications the same stopping effect is attained as in that illustrated in Fig. 7. The bars 35 and 36 will have different graduations in each case.

Having now explained my improvements, what I claim as my invention and desire to secure by Letters Patent, is—

1. In a cheese cutter, the combination of a base, a revoluble carrier, an operating lever pivoted at or near the center of the carrier, an arm pivoted concentric with the operating lever, operative connections between the operating lever and arm whereby a given angular movement of the operating lever causes an angular movement of the arm of less extent, and engaging means between said arm and carrier.

2. In a cheese cutter, the combination of a base, a table revoluble on said base, an arm having means to engage said table to revolve the same, an operating lever, said arm and lever having a common pivot, and a movable operative connection between the arm and lever whereby a given angular movement of the lever causes an angular movement of less extent in said arm.

3. In a cheese cutter, the combination of a base, a table revoluble on said base, an arm pivoted on said base and adapted to actuate said table, a sector pivoted on said base eccentric with said arm and engaging said arm to actuate the same, the path of the point of engagement between said arm and sector being circular, and longitudinal of said arm, thereby causing the rate of circular movement of the arm to constantly decrease and the arm to stop during the actuating movement of the sector.

4. In a cheese cutter, the combination of a base, a table revoluble on said base, an arm pivoted on said base and adapted to actuate said table, a sector pivoted on said base eccentric with said arm and engaging said arm to actuate the same, the path of the point of engagement between said arm and sector being circular, and longitudinal of said arm, thereby causing the rate of circular movement of the arm to constantly decrease and the arm to stop during the actuating movement of the sector, and an operating lever to actuate the sector, arm and table.

5. In a cheese cutter, the combination of a base, a table revoluble on said base, a notched ring secured to said table, a slotted arm carrying pawls to engage said notched ring, a toothed sector pivoted on said base and having a pin engaging in the slot in said arm to actuate said table, a pivoted actuating lever having a toothed segment to engage the toothed portion of said sector, and a plurality of adjustable stops to determine the extent of movement of said lever.

6. In a cheese cutter, the combination of a base, a table revoluble on said base, a notched ring secured to said table, a slotted arm carrying pawls to engage said notched ring, a toothed sector pivoted on said base and having a pin engaging in the slot in said arm to actuate said table, a pivoted actuating lever having a toothed segment to engage the toothed portion of said sector, a plurality of adjustable stops to determine the extent of movement of said lever, and graduated bars for supporting said stops.

7. In a cheese cutter, the combination of a base, a table revoluble on said base, a notched ring secured to said table, an arm carrying pawls to engage said ring, a sector pivoted on said base and having means to engage said arm to actuate the same, an operating lever to actuate said sector, and a plurality of adjustable stops to determine the extent of movement of said lever and table.

8. In a cheese cutter, the combination of a base, a table revoluble on said base, a notched ring secured to said table, an arm carrying pawls to engage said ring, a sector pivoted on said base and having means to engage said arm to actuate the same, an operating lever to actuate said sector, a plurality of adjustable stops to determine the extent of movement of said lever and table, and graduated bars for supporting said stops.

9. In a cheese cutter, the combination of a base, a revoluble carrier, mechanism for revolving said carrier comprising an arm and a pivoted element so arranged as to move said arm at constantly decreasing speed relative to the rate of movement of said pivoted element, whereby the movement of said carrier ends before the end of the movement of said pivoted element, and a lever for oscillating the pivoted element, said lever being pivoted concentrically with said arm.

10. In a cheese cutter, the combination of a base, a table revoluble on said base, a flexible lever to actuate said table, upper and lower adjustable stops carried by said base, said lever normally adapted to contact with said lower stop but adapted to be sprung up to contact with the upper stop, said lower stop provided with an extension adapted to support said lever that it may contact with the upper stop.

11. In a cheese cutter, the combination of a base, two graduated bars secured to said base, a revoluble table mounted on said base, a lever for operating said table, said lever normally resting on the lower graduated bar but adapted to be bent up to contact with the upper bar, an adjustable stop on said upper bar, and an adjustable stop on said lower bar and having an extension adapted to guide said operating lever into contact with the stop on said upper bar.

12. In a cheese cutter, the combination of a base, a revoluble table, a reciprocating handle for moving said table a predetermined distance when the handle is moved in one direction, a fixed stop for terminating the movement of said handle in said direction, an indicator having a series of graduations for determining the extent of movement of said handle away from said fixed stop and connections between said handle and said table whereby the ratio of angular movements of the handle and table changes so as to equalize more nearly the distances between said graduations.

13. In a cheese cutter, the combination of a base, a revoluble table, a reciprocating handle for moving said table predetermined distances in one direction, two separate adjustable stops for limiting the movement of the handle in one direction, a fixed stop for limiting the movement of the handle in the opposite direction, and connections between said handle and said table whereby the table is moved by the handle when said handle is moved toward the fixed stop, only.

14. In a cheese cutter, the combination of the base, a revoluble table, a reciprocating handle for moving said table predetermined distances in one direction, two separate adjustable stops for limiting the movement of the handle in one direction and so arranged that the handle may be moved against either stop at will and so as to prevent the handle from passing both stops.

15. In a cheese cutter, the combination of a base, a table revoluble on said base, an arm pivoted on said base and adapted to actuate said table, an independently mounted member pivoted on said base eccentric with said arm and engaging said arm to actuate the same, the path of the point of engagement between said arm and member being in an arc of a circle, and longitudinal of said arm, thereby causing the rate of circular movement of the arm to constantly decrease and the arm to stop during the actuating movement of the member.

16. In a cheese cutter, the combination of a base, a table revoluble on said base, a notched ring secured to said table, an arm carrying pawls to engage said ring, an independently mounted member pivoted on said base and having means to engage said arm to actuate the same, an operating lever to actuate said member, and a plurality of adjustable stops to determine the extent of movement of said lever and table.

17. In a cheese cutter, the combination of a base, a table revoluble on said base, a notched ring secured to said table, an arm carrying pawls to engage said ring, an independently mounted member pivoted on said base and having means to engage said arm to actuate the same, an operating lever to actuate said member, a plurality of adjustable stops to determine the extent of movement of said lever and table, and graduated bars for supporting said stops.

18. In a cheese cutter the combination of a base, a revoluble table, a reciprocating handle for moving said table a predetermined distance in one direction, an adjustable stop for limiting the movement of the handle in one direction, a fixed stop for limiting the movement of the handle in the opposite direction, and connections between said handle and said table whereby the table is moved by the handle when said handle is moved toward the fixed stop only.

19. In a cheese cutter the combination of a base, a revoluble table, a reciprocating handle for moving said table a predetermined distance in one direction, a plurality of adjustable stops for limiting the movement of the handle in one direction, a fixed stop for limiting the movement of the handle in the opposite direction, and connections between said handle and said table whereby the table is moved by the handle when said handle is moved toward the fixed stop only.

20. In a cheese cutter the combination of a base, a revoluble table, a reciprocating handle for moving said table a predetermined distance in one direction, a plurality of adjustable stops for limiting the movement of the handle in one direction, a fixed stop for limiting the movement of the handle in the opposite direction, and connections between said handle and said table whereby the table is moved by the handle when said handle is moved toward the fixed stop only, and whereby the movement of the table gradually ceases before the handle reaches the limit of its throw.

21. A cheese cutter comprising a frame, a cheese board pivoted on said frame, means for rotating said board having an operating lever, a back stop which arrests the backward movement of said lever, and two front stops adapted to arrest the lever at different points in its forward movement.

22. In a cheese cutter, the combination of a base, a revoluble table, a lever for moving said table a predetermined distance, said lever being pivoted concentric with the table, and connections between the lever and table whereby the movement of the table ceases before the movement of the lever ceases.

23. In a cheese cutter, the combination of a base, a revoluble table, a handle for moving said table a predetermined distance and pivoted concentric therewith, and connections between the table and handle whereby the movement of the table gradually ceases with a constant rate of movement of the handle.

24. In a cheese cutter, the combination of a base, a revoluble table, a handle for moving the table in one direction, and a plurality of adjustable stops for limiting the movement of the handle in one direction, said handle being adapted to contact with a a selected stop at the will of the operator.

In testimony whereof, I have signed my name to this specification in the presence of two subscribing witnesses.

FRANCIS C. OSBORN.

Witnesses:
 EDWARD N. PAGELSEN,
 RALPH E. PRESTON.